United States Patent [19]

Schenavar et al.

[11] 3,786,537

[45] Jan. 22, 1974

[54] GRIPPER FOR ELONGATED MEMBERS

[76] Inventors: Harold E. Schenavar, 18696 Inkster, Detroit, Mich. 48240; Irving L. Pierce, 760 Trombley, Grosse Point Park, Mich. 48230

[22] Filed: Aug. 11, 1972

[21] Appl. No.: 279,979

[52] U.S. Cl. .............................. 24/134 R, 43/42.74
[51] Int. Cl. ...................... A01k 91/04, F16g 11/04
[58] Field of Search.... 16/114 B; 24/73 HH, 73 HL, 24/73 HR, 71.2, 71.1, 261 AC, 261 PT, 134 KB, 134 KC, 134 E, 134 EA, 134 R, 134; 43/43.1, 42.49, 42.74, 42.19; 294/26

[56] References Cited
UNITED STATES PATENTS

| | | | |
|---|---|---|---|
| 1,254,458 | 1/1918 | Wilson | 24/134 R |
| 1,698,193 | 1/1929 | Geer | 43/42.19 |
| 1,781,077 | 11/1930 | Petersen | 294/26 |
| 2,545,326 | 3/1951 | Westfall et al. | 43/42.74 |
| 2,816,155 | 12/1957 | Barnes | 24/73 HL X |
| 3,708,196 | 1/1973 | Snell | 294/26 |

*Primary Examiner*—Donald A. Griffin
*Attorney, Agent, or Firm*—Willis Bugbee

[57] ABSTRACT

Disposed approximately perpendicular to the opposite ends of an elongated bridge portion are two approximately parallel hook arms having reversely-bent ends providing Vee-notches into which the elongated member to be gripped is wedged by a jam element approximately midway between the arms and of slightly greater width than the length of the arms whereby to urge the bridge portion away from the elongated member and consequently to wedge the elongated member into the Vee-notches. In FIGS. 1 and 2 the jam element is a bead or block threaded onto the elongated member, for example, a resilient wire. In FIGS. 3 and 4 the jam element is a cam portion on the end of a handle pivotally mounted on the bridge portion for engagement with the elongated member, for example a rod or pipe, held in the hook arms.

2 Claims, 4 Drawing Figures

PATENTED JAN 22 1974 3,786,537

GRIPPER FOR ELONGATED MEMBERS

SUMMARY OF THE INVENTION

The Vee-notched hook arms on opposite ends of the bridge portion flexed by a jam element disposed between the elongated member to be gripped and the bridge portion is of sufficiently greater width than the space therebetween so as to flex the bridge portion and consequently urge the elongated member and the Vee-notched arms into wedging engagement with one another.

IN THE DRAWINGS

Figure 1:
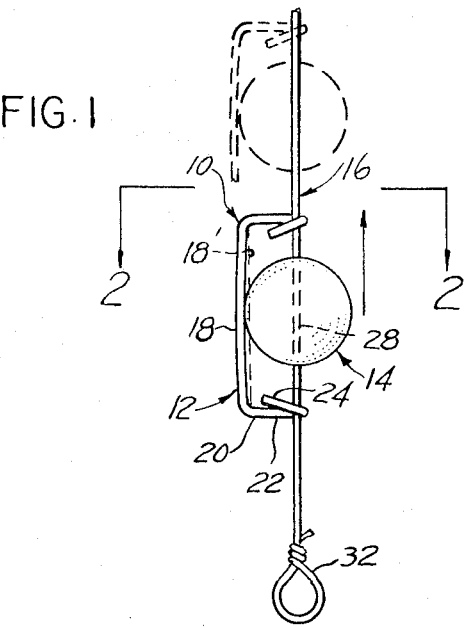
FIG. 1 is a side elevation of a gripper for an elongated wire fishing leader wedged into a fixed but adjustable position on the wire by a bead threaded thereon as a jam element, an optional position being shown in dotted lines.
Figure 2:
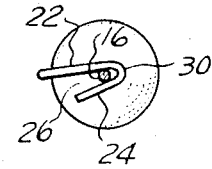
FIG. 2 is a cross-section taken along the line 2—2 in FIG. 1.

Referring to the drawings in detail, FIGS. 1 and 2 show an elongated member gripper, generally designated 10, consisting generally of a holder 12 of resilient material such as spring wire engaged by a jam element 14 such as a bead, threaded upon the elongated member 16, such as a fishing wire leader. The holder 12 has an elongated bridge portion 18 having at its opposite ends gripping arms 20 consisting of perpendicular portions 22 terminating in reversely-bent end portions 24 disposed in approximately Vee-shaped formation (FIG. 2) to provide Vee-notches 26 in which the elongated member 16 is gripped. The jam element 14 has a diametral hole 28 through which the elongated member 16 passes, and is of slightly greater radius than the distance between the elongated member 16 and the bridge portion 18 in its relaxed position in the absence of the jam element 14, as shown by the dotted line 18' in FIG. 1.

From FIG. 1 it will be seen that the end portions 24 are bent slightly toward one another so that they do not lie in planes perpendicular to the elongated member 16. It will be understood that the separation of the portions 22 and 24 near their junction 30 (FIG. 2) is slightly less than the diameter of the elongated member 16 so that the latter will become firmly but yieldingly wedged into the Vee-notches 26 when the jam element 14 flexes the bridge portion 18 from its straight (dotted-line) position into its arcuate (solid-line) position (FIG. 1). The elongated member 16 terminates at its lower end in a loop 32 for the attachment of a swivel, sinker or the like.

The operation of the gripper 10 is believed to be seen from the above description. The gripper 12 finds a particular use as an adjustable stop in supporting one or more outriggers at any desired position above the bottom of a water course in which the fisherman is fishing. Such an outrigger is shown in our U.S. Pat. No. 3,650,063 issued Mar. 21, 1972, for Outrigger Fishing Device with Quick-Detachable Hook Coupling. When so used, the gripper 10 is pushed upward or downward along the wire 16 by the application of a force sufficient to overcome the friction between the wire 16 and the arms 20.

Figure 3:
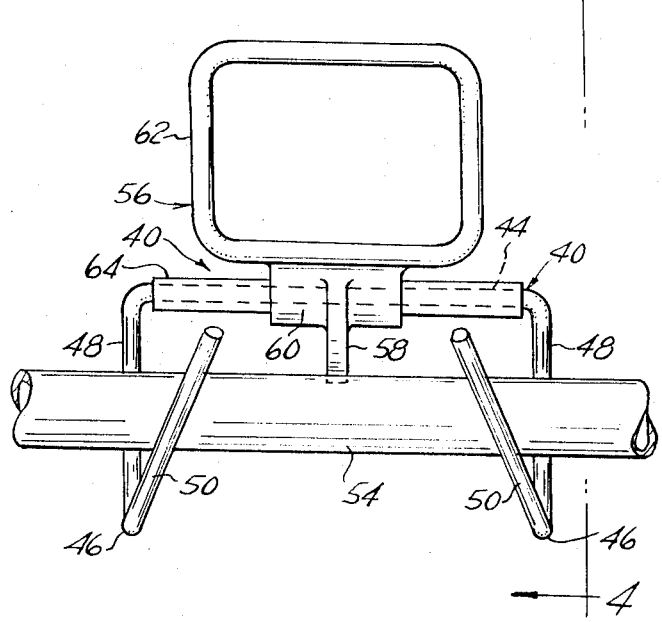
FIG. 3 is a side elevation of a gripper for an elongated pipe or tube with the latter urged into wedging engagement in the hooked end arms by a cam portion on a handle adjustably pivoted to the bridge portion.
Figure 4:
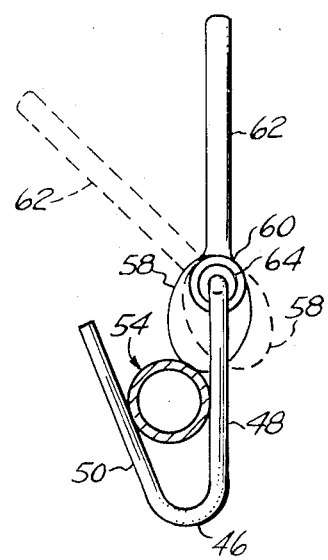
FIG. 4 is a side elevation, partly in vertical section, of the elongated member gripper shown in FIG. 3 taken along the line 4—4 therein.

The gripper, generally designated 40, shown in FIGS. 3 and 4 has a similarly-shaped holder 42 to the holder 12 of FIG. 1 in that it has a similar bridge portion 44 with reversely-bent hook arms 46 including arm portions 48 bent approximately perpendicular to the bridge portion 44 and end reversely-bent portions 50 inclined toward one another and forming with the arm portions 48 approximately Vee-shaped notches 52 (FIG. 4) into which the elongated member 54 to be gripped is urged by a jam element, generally designated 56, including a cam portion 58 extending downward from and preferably integral with a hub portion 60 having a handle ring 62 projecting upward therefrom. The hub 60 is pivotally mounted on the bridge portion 44 by means of an intermediate elongated sleeve portion 64 disposed therebetween.

In operation, when the handle ring 62 is swung into the dotted line position shown in FIG. 4, it swings the hub 60 and cam portion 58 in a counterclockwise direction away from the Vee-shaped notches 52 so that the ends 50 of the hook-shaped arms 46 can be inserted beneath the elongated member 54, such as a pipe, bar or rod. The handle ring 62 is then swung clockwise into its vertical position shown in solid lines in FIG. 4, thereby swinging the cam portion 58 into jamming engagement with the elongated member 54 so as to force or urge the latter into wedging engagement with the Vee-notches 46. The operator can then lift and carry the elongated member 54 from place to place, such as in handling pipe lengths, bar stock, or the like.

It will be evident from FIGS. 3 and 4 that the jam element 14 of FIGS. 1 and 2 may be made adjustable by replacing the bead 14 with an eccentric cam like the cam portion 58 and hub 60 without the sleeve portion 64. The wire 16 can then be gripped with an adjustable thrust by rotating the cam portion 58 as far as is necessary to achieve the desired grip.

We claim:

1. A gripper for holding fast to an elongated member, said gripper comprising a holder member having an elongated bridge portion and a pair of arms disposed transversely thereto at opposite ends thereof, said arms at their outer ends having hook portions thereon adapted to receive and hold the elongated member, and a jam element adapted to be mounted on one of said members in wedging engagement therebetween and urging said elongated member into said hook portions of said arms in secured engagement therewith, said jam element comprising a body having a bore therethrough adapted to receive said elongated member for threading thereon, said holder member being of spring wire with said bridge portion adapted to be deformed by its engagement with said body on said elongated member.

2. A gripper, according to claim 1, wherein said hook portions are approximately Vee-shaped.